US011085905B2

(12) United States Patent
Tarafder et al.

(10) Patent No.: US 11,085,905 B2
(45) Date of Patent: Aug. 10, 2021

(54) TECHNIQUES FOR MONITORING CHROMATOGRAPHIC FLUID FLOWS

(71) Applicant: WATERS TECHNOLOGIES CORPORATION, Milford, MA (US)

(72) Inventors: Abhijit Tarafder, Franklin, MA (US); Jonathan Belanger, Whitinsville, MA (US); Moon Chul Jung, Waltham, MA (US); Wade P. Leveille, Douglas, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 46 days.

(21) Appl. No.: 16/439,484

(22) Filed: Jun. 12, 2019

(65) Prior Publication Data

US 2019/0376937 A1    Dec. 12, 2019

Related U.S. Application Data

(60) Provisional application No. 62/683,864, filed on Jun. 12, 2018.

(51) Int. Cl.
*G01N 30/76*   (2006.01)
*G01N 9/32*    (2006.01)
(Continued)

(52) U.S. Cl.
CPC ............. *G01N 30/76* (2013.01); *G01N 9/32* (2013.01); *G08B 3/10* (2013.01); *G08B 5/36* (2013.01);
(Continued)

(58) Field of Classification Search
CPC .... G01N 30/76; G01N 9/32; G01N 2030/027; G08B 3/10; G08B 5/36; G08B 21/182
See application file for complete search history.

(56) References Cited

U.S. PATENT DOCUMENTS 4,239,623 A    12/1980 Schrenker
4,373,376 A *   2/1983 Narato .................. G01N 30/06
                                           73/23.35
(Continued)

OTHER PUBLICATIONS

International Search Report and Written Opinion for International Patent Application No. PVT/US2019/036819, dated Aug. 29, 2019.

*Primary Examiner* — Brian A Zimmerman
*Assistant Examiner* — Kevin Lau
(74) *Attorney, Agent, or Firm* — Kacvinsky Daisak Bluni PLLC

(57) ABSTRACT

Various embodiments are generally directed to techniques for monitoring chromatographic fluid flows, such as the flow to and/or from one or more reservoirs used in chromatographic operations, for instance. In many embodiments, the chromatographic operations may include one or more of High Performance Liquid Chromatography (HPLC), Ultra Performance Liquid Chromatography (UPLC), Ultra Performance Convergence Chromatography (UPC2), and the like. Several embodiments are particularly directed to a chromatographic fluid flow device (CFFD) for monitoring a change in density of a chromatographic fluid in a tube, such as by detecting the presence or absence of gas in the tube with an ultrasonic bubble detector. In various embodiments, the chromatographic fluid may include a solvent, a sample, or waste associated with a chromatographic operation.

19 Claims, 9 Drawing Sheets

(51) Int. Cl.
*G08B 3/10* (2006.01)
*G08B 5/36* (2006.01)
*G08B 21/18* (2006.01)
*G01N 30/02* (2006.01)

(52) U.S. Cl.
CPC ..... G08B 21/182 (2013.01); *G01N 2030/027* (2013.01)

(56) References Cited

U.S. PATENT DOCUMENTS

| | | | |
|---|---|---|---|
| 4,543,815 A * | 10/1985 | Troup | G01N 21/534 |
| | | | 340/628 |
| 4,674,323 A * | 6/1987 | Rulf | G01N 30/88 |
| | | | 422/70 |
| 5,005,434 A | 4/1991 | Watanabe et al. | |
| 5,397,467 A * | 3/1995 | Morgan | B01D 15/08 |
| | | | 210/101 |
| 2003/0000291 A1* | 1/2003 | Kolosov | G01N 30/76 |
| | | | 73/61.52 |
| 2010/0044396 A1* | 2/2010 | Skillern | A45F 3/20 |
| | | | 222/209 |
| 2012/0308409 A1* | 12/2012 | Levine | G01F 15/005 |
| | | | 417/274 |
| 2013/0333467 A1 | 12/2013 | Jarrell | |
| 2017/0248449 A1* | 8/2017 | Kareco | G01L 19/142 |
| 2018/0112824 A1* | 4/2018 | Gaddis | F17C 5/04 |
| 2018/0236376 A1* | 8/2018 | Hattori | G01N 30/8658 |
| 2019/0170723 A1* | 6/2019 | Wheeler | G01N 33/225 |
| 2020/0038778 A1* | 2/2020 | Schwan | B01D 19/0036 |

* cited by examiner

600

TECHNIQUES FOR MONITORING CHROMATOGRAPHIC FLUID FLOWS

CROSS-REFERENCE TO RELATED APPLICATION

This application claims the benefit of U.S. Provisional Patent Application No. 62/683,864, filed on Jun. 12, 2018, the entire contents of which is incorporated by reference.

BACKGROUND

Chromatography includes the separation of a mixture or sample into different constituents. Typically, the mixture injected into a fluid stream referred to as the mobile phase; and the mobile phase carry the mixture through a structure, such as a column, holding another material referred to as the stationary phase. In various embodiments, different constituents of the mixture may travel through the stationary phase at different speeds, resulting in their separation. More specifically, the separation is based on differential partitioning between the mobile and stationary phases.

SUMMARY

Various embodiments are generally directed to techniques for monitoring chromatographic fluid flows, such as flow to and/or from one or more reservoirs used in chromatographic operations, for instance (as used herein "fluid" and "liquid" may be used interchangeably). In many embodiments, the chromatographic operations may include one or more of High Performance Liquid Chromatography (HPLC), Ultra Performance Liquid Chromatography (UPLC), Ultra Performance Convergence Chromatography (UPC2), and the like. Several embodiments are particularly directed to a chromatographic fluid flow device (CFFD) for indicating a change in density of a chromatographic fluid in a tube, such as by detecting the presence or absence of a gas in the fluid with an ultrasonic bubble detector (e.g., via a 50% or more reduction in density within the tube)(as used herein the term "gas" includes mixtures of gases, such as air, and liquid vapors, such as chromatographic fluid vapors). In various embodiments, the chromatographic fluid may include a solvent, a sample, or waste associated with a chromatographic operation. In some embodiments, the CFFD may couple to a reservoir with chromatographic fluid and provide a tube access to the reservoir there through. These and other embodiments are described and claimed.

In one or more embodiments, for example, a device for monitoring chromatographic fluid flow may include a reservoir coupler, a tube port, a transducer, and logic circuitry. In various embodiments, the reservoir coupler may attach to a reservoir comprising a chromatographic fluid. In some embodiments, the tube port may provide a tube, such as a solvent line, with access to the reservoir. In some such embodiments, the tube may access the reservoir to establish fluid communication between the reservoir and the tube. For example, to enable a pump to draw a solvent from the reservoir. In many embodiments, the transducer may monitor a change in density of the chromatographic fluid in the tube. For instance, the transducer may detect the presence or absence of gas (e.g., bubbles of air or vapor) in the tube to monitor changes in density. In some embodiments, the transducer may detect a 50% reduction in density to monitor changes in density. In various embodiments, the logic circuitry may be communicatively coupled to the transducer and a communication interface. In various such embodiments, the logic circuitry may communicate an indication via the communication interface based on the change in density of the chromatographic fluid monitored in the tube. For instance, the logic circuitry may communicate an indication via the communication interface when a 50% or more reduction in density within the tube is detected.

In many embodiments, for instance, the CFFD may be used as part of a chromatography system that includes a sample reservoir, an injector, a solvent reservoir, a pump, a chromatographic column, a detector, a waste reservoir, and a system controller. In some embodiments, the injector may inject a sample from the sample reservoir into a flow of solvent. In some such embodiments, the flow of solvent may cause the sample to pass through the chromatographic column, past the detector, and into the waste reservoir. In various embodiments, the pump may create the flow of solvent through the chromatographic column. In various such embodiments, the solvent may be pumped from the solvent reservoir. In several embodiments described herein, one or more CFFDs may be used to monitor the flow of chromatographic fluid into and/or out of one or more of the sample, solvent, and waste reservoirs.

Some challenges facing chromatographic systems include devices that require excessive monitoring and oversight to stay in operational condition. The challenges may result from maintenance requirements, such as the need to manually inspect several aspects of a chromatographic process. Further, manual inspection may require costly downtime. For instance, visual inspection may be required to determine the level of fluid in a solvent or waste reservoir. In some instances, safety requirements for handling and storing chromatographic liquids (e.g., flammable ones) may dictate a waste reservoir be constructed from an opaque material, such as metal, making it difficult to manually inspect. Adding further complexity, entrapment of bubbles and depletion of a chromatographic fluid may cause disruptions in operation and/or repeatability issues. For example, when the solvent reservoir inadvertently becomes empty, sufficient air may be drawn into the system to impede operation of a pump. In another example, a waste reservoir may inadvertently overflow, leading to excess downtime and additional maintenance. These and other factors may result in chromatography systems with limited flexibility, low efficiency, and/or deficient performance. Such limitations can drastically reduce the capabilities, usability, and applicability of chromatography systems, contributing to ineffective systems with limited adaptability.

Various embodiments described herein include a chromatographic fluid flow device (CFFD) that monitors the flow of a fluid into and/or out of a reservoir. In some embodiments, the CFFD may utilize a transducer to monitor change in density of fluid entering or exiting a reservoir. For instance, the transducer may include an ultrasonic bubble detector. In several embodiments, the CFFD may couple to the reservoir and provide a tube with access to the reservoir such that fluid can enter or exit the reservoir via the tube. In several embodiments, these and other features described herein may enable automated monitoring of fluid levels in various reservoirs utilized in chromatographic operations. In various embodiments, the CFFD may generate a signal based on the monitored change in density of fluid entering or exiting a reservoir (e.g., a 50% or more change in density). For instance, a light or buzzer may be activated when a fluid level is low (e.g., in a solvent reservoir), or conversely, when a fluid level is high (e.g., in a waste reservoir). In some embodiments, the signal generated by the CFFD may be communicated to a system controller for corrective and/or preventative actions. For instance, the system controller may activate a secondary waste or solvent reservoir to prevent or limit operational downtime. In these and other ways one or more of the CFFDs described herein may monitor chromatographic fluid flows in an accurate, reliable, and efficient manner to achieve improved chromatographic operations, resulting in several technical effects and advantages.

DETAILED DESCRIPTION

Figure 1:
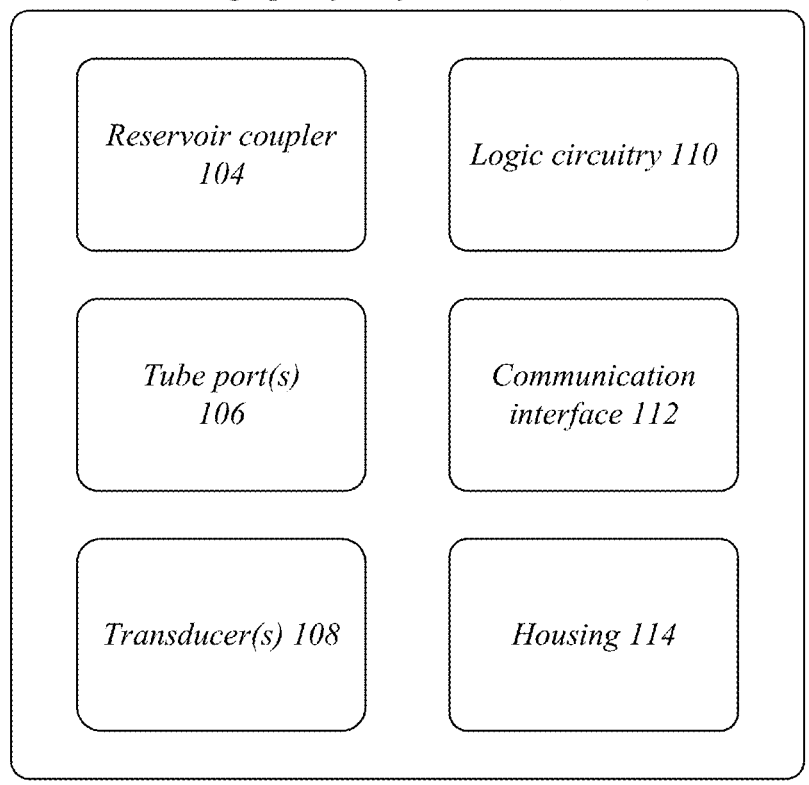
FIG. 1 illustrates an example of a chromatographic fluid flow device (CFFD) according to one or more embodiments described herein.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of an operating environment 100 that may be representative of various embodiments. Operating environment 100 may include chromatographic fluid flow device (CFFD) 102. In one or more embodiments described here, CFFD 102 may monitor the flow of a fluid into and/or out of a reservoir. In one or more such embodiments, the CFFD 102 may provide an indication of the level of fluid in the reservoir based on the monitored flow. For example, one or more transducers 108 may monitor the change in density of a chromatographic fluid passing through one or more tube ports 106 in the CFFD 102, such as through a tube inserted into the reservoir through a tube port. Embodiments are not limited in this context.

In operating environment 100, CFFD 102 may include a reservoir coupler 104, one or more tube ports 106, one or more transducers 108, logic circuitry 110, communication interface 112, and housing 114. In various embodiments, reservoir coupler 104 may connect the CFFD 102 to a reservoir for monitoring. For example, reservoir coupler 104 may include one or more of a stopper, a threaded cap, and a clamped cap to attach to the reservoir. In some embodiments, the reservoir coupler 104 may be connected to the housing 114. In one or more embodiments, the reservoir coupler 104 and the housing 114 may be formed from a single piece. In many embodiments, tube port 106 may include an opening in housing 114 that provides access to the reservoir. For instance, a tube, such as a supply line or dip tube, may be inserted through the tube port 106 and into the reservoir. In some embodiments, one or more CFFDs described herein, or components thereof, may be the same or similar to one or more other CFFDs, or components thereof, described herein. For example, a CFFD described with respect to a first figure may include features or components of another CFFD described with respect to a second figure.

In various embodiments, housing 114 may enclose and/or protect one or more components of CFFD 102. For example, housing 114 may enclose one or more of transducer 108, logic circuitry 110, and communication interface 112. In some embodiments, housing 114 may include an overmold of one or more components of CFFD 102. For instance, housing 114 may include an overmold of transducer 108. In several embodiments, housing 114 may be constructed from a polymer. In many embodiments, housing 114 may protect one or more of transducer 108, logic circuitry 110, and communication interface 112 from coming into contact with a fluid that comes into contact with the CFFD 102. It will be appreciated that terms illustrated with '(s)' (e.g., transducer (s) 108 in FIG. 1) may be referred to in the plural and/or singular for ease of description, however any number and/or combination may be employed without departing from the scope of this disclosure.

In some embodiments, CFFD 102 may include one or more tube ports 106. In some such embodiments, a fluid line may be inserted into a reservoir through one of tube ports 106. In many embodiments, tube port 106 may maintain a tube inserted therethrough in a desired position. For example, tube port 106 may create sufficient friction with a tube inserted therethrough to hold the tube in place. As will be described in more detail below, in some instances, a port coupler may be used in conjunction with a tube port 106 to hold the tube in place (see e.g., FIG. 6).

In many embodiments, as fluid passes through the tube port 106, transducer 108 may monitor a change in density of the fluid. For instance, transducer 108 may monitor the change in density of the fluid by detecting the presence or absence of gas (e.g., bubbles of air or vapor) in a tube in the tube port 106. In such instances, the transducer 108 may include an ultrasonic bubble detector. Several embodiments may include one or more transducers 108 and/or tube ports 106. For example, each tube port 106 may have a corresponding transducer 108 to monitor the flow of a liquid therethrough. In various embodiments, at least a portion of the transducer may transmit and receive signals within tube port 106 to monitor a change density of the fluid passing through the port, such as through a dip tube. In one or more embodiments, logic circuitry 110 may determine an appropriate communication to convey via communication interface 112 based on the change in density monitored by transducer 108. For example, communication interface 112 may include a light emitting diode (LED) that logic circuitry 110 causes to flash when the change in the density of the fluid exceeds a threshold, such as a 50% change in the density.

In various embodiments, transducer 108 may include one or more types of ultrasonic sensors. For example, a first type may transmit sound waves from a transmitter, through the fluid, to a receiver that detects the waves. In another example, a second type may utilize pulse-echoes. In other words, sound waves may be transmitted into a fluid, reflected, and received by the same transmitter that sent the sound waves. In either example, the presence of gas (e.g., bubbles of air or vapor) may have an effect on the velocity, attenuation, and/or scattering of the sound, enable detection of the gas. In one or more embodiments, transducer 108 may include a non-invasive ultrasonic bubble sensor that uses an active piezoelectric element as a piezoelectric transmitter to generate high frequency acoustic waves. In one or more such embodiments, the acoustic wave travels through a sensor wall coupled to the tubing that is in contact with that wall, such as via wet or dry coupling. In some such embodiments, the wave may then travel through the fluid-filled tubing to the opposite sensor wall and may be received by a passive piezoelectric element on the other side. In some embodiments, dry coupling material (e.g., material of tubing) may include polymers, elastomers, plastomers, silicon-based materials, and/or any other relatively flexible substance than can convey sound waves. In several embodiments, the ability to sense whether a fluid, such as a solvent or a sample, or a gas is present may be due to a large acoustic impedance difference that exists between the tubing wall or fluid and gas (as used herein the term "gas" includes mixtures of gases such as air and liquid vapors). In several such embodiments, this large impedance mismatch may create an acoustic mirror which reflects the ultrasonic wave back in the direction of the transmitter. If reflected acoustic energy on the transmitter side of the tubing increases and/or if transmitted acoustic energy reaching the side of the tubing opposite the transmitter decreases, the sensor may indicate the presence of a gas.

Logic circuitry 110 may include one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processing circuitry, processor or processing circuit on a single chip or integrated circuit. In various embodiments, logic circuitry 110 may include, or be implemented via, one or more components of computing architecture 800 of FIG. 8. The logic circuitry 110 may be connected to and communicate elements of a chromatography system (e.g., chromatography system 220 of FIG. 2) in addition to components of CFFD 102. In some embodiments, logic circuitry may include one or more of storage, memory, and the one or more interfaces. In some such embodiments, logic circuitry 110 may comprise one or more other components of CFFD 102, such as communication interface 112 or transducer 108. In one or more embodiments logic circuitry 110 may perform calculations with and/or manipulate data collected by transducer 108. For instance, logic circuitry 110 may compare data collected by transducer 108 to a threshold. In some instances, logic circuitry 110 may summate, normalize, or otherwise manipulate data collected by transducer 108.

In one or more embodiments, communication interface 112 may be utilized by logic circuitry to communicate with one or more of a user and a computing device. For instance, logic circuitry 110 may utilize communication interface 112 to send signals to a system controller. In such instances, and as will be described in more detail below, the system controller may adjust one or more parameters associated with a chromatographic operation based on signals from CFFD 102. In some embodiments, communication interface 112 may include, or be implemented via, one or more components of communications architecture 900 of FIG. 9. In various embodiments, communication interface 112 may include any device utilized by logic circuitry 110 to convey information based on measurements performed by transducer 108. In several embodiments, communication interface 112 may include a data bus. In many embodiments, communication interface 112 may include a wired connection. In some embodiments, communications interface 112 may include a wireless radio, such as for communication over Wi-Fi. In various embodiments, communications interface 112 may include a device that generates an electronic, audible, and/or visual alert or signal. For example, communications interface 112 may include a buzzer. In some embodiments, CFFD 102 may include an internal or external power source to provide power to one or more of transducers 108, logic circuitry 110, and communication interface 112.

Figure 2:
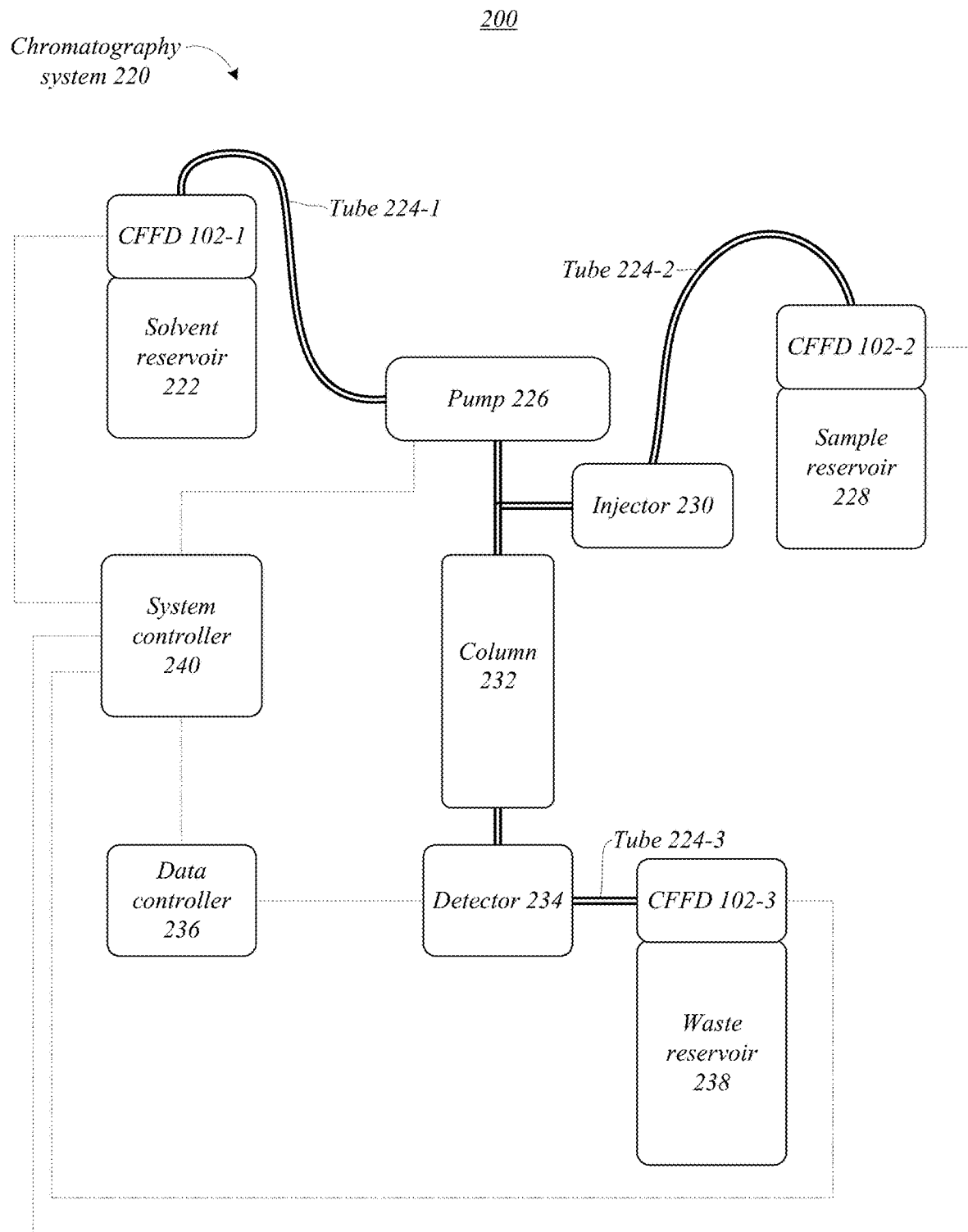
FIG. 2 illustrates an example of a chromatography system according to one or more embodiments described herein.

FIG. 2 illustrates an embodiment of an operating environment 200 that may be representative of various embodiments. Operating environment 200 may include a chromatography system 220 (or system 220). In several embodiments, the system 220 may perform chromatographic operations. For instance, the chromatographic operations performed by system 220 may include one or more of High Performance Liquid Chromatography (HPLC), Ultra Performance Liquid Chromatography (UPLC), Ultra Performance Convergence Chromatography (UPC2), and the like. In one or more embodiments described herein, the system 220 may include one or more CFFDs (e.g., CFDDs 102-1, 102-2, 102-3) used to monitor changes in density of fluids entering and/or exiting respective reservoirs (e.g., solvent reservoir 222, sample reservoir 228, waste reservoir 238). In such embodiments, an alert may be generated and/or one or more operational parameters may be adjusted based on the fluid changes in density. For example, a light may blink to indicate solvent reservoir 222 almost empty or a signal indicating waste reservoir 238 is full may cause system controller 240 to stop or reduce the speed of pump 226. In many embodiments, system 220 may be used to separate a mixture into different constituents by pumping a mobile phase through column 232. Embodiments are not limited in this context.

In the illustrated embodiment, system 220 includes CFFDs 102-1, 102-2, 102-3, solvent reservoir 222, tubes 224-1, 224-2, 224-3, pump 226, sample reservoir 228, injector 230, column 232, detector 234, data controller 236, waste reservoir 238, and system controller 240. In various embodiments, pump 226 may generate a flow of solvent through column 232 by pumping solvent from solvent reservoir 222 via tube 224-1. In some embodiments, the injector 230 may inject a sample received from the sample reservoir 228 via tube 224-2 into the flow of solvent. In some such embodiments, the flow of solvent may cause the sample to pass through column 232 in a chromatographic process, past the detector 234, and into the waste reservoir 238. It will be appreciated that one or more additional or different CFFDs may be used in conjunction with any fluid supplies or reservoirs in a chromatography system without departing from the scope of the disclosure. For instance, CFFDs may be used with weak and/or strong needle wash solvent reservoirs. In such examples, the weak and/or strong need wash solvent reservoirs may be fluidically connected to the injector 230, separate from the sample reservoir 228.

In one or more embodiments described herein, the CFFDs 102-1, 102-2, 102-3 may operate to monitor the flow of chromatographic fluid into and/or out of the solvent reservoir 222, the sample reservoir 228, and the waste reservoir 238, respectively. For example, CFFD 102-1 may couple with the solvent reservoir 222. In such instances, CFFD 102-1 may include a transducer for detecting the presence of a gas (e.g. air or vapor bubbles) in the tube 224-1, and the CFFD 102-1 may generate one or more signals based on detection of gas in the tube 224-1. In some embodiments, a signal may be communicated to system controller 240. In various embodiments, a signal may include an optical or audible signal.

In various embodiments, one or more of CFFDs 102-1, 102-2, 102-3 (or CFDs 102) may comprise one or more ultrasonic bubble detectors to detect to presence or absence of gas in the tubes 224-1, 224-2, 224-3. In some embodiments, the system 220 may include a system controller 240 communicatively coupled to each of the CFFDs 102. In one or more embodiments, system controller 240 may communicate with the CFFDs 102 via wireless signals. In several embodiments, system controller 240 may perform one or more preventative and/or corrective actions based on signals received from the CFFDs 102. For example, system controller may control operation of one or more of CFFDs 102, pump 226, injector 230, detector 234, and data controller 236 based on signals received from the CFFDs 102. In some examples, system controller may switch to a secondary or alternate reservoir based on a signal from one or more of CFFDs 102. For instance, system controller 240 may switch from waste reservoir 238 to a back-up waste reservoir based on a signal from CFFD 102-3 indicating absence of gas (and thus the presence of waste fluid), for example, in a vent tube forming part of CFFD 102-3. In various such instances, a valve may be actuated, such as by CFFD 102-3 to switch to the back-up waste reservoir.

In some embodiments, the system controller 240 may perform one or more tasks when an amount of bubbles detected in the tube exceeds a threshold. In some such embodiments, the threshold may be based on a number of bubbles detected by the transducer. In various embodiments, the system controller 240 may perform the one or more tasks when the amount of bubbles detected in the tube exceeds the threshold for a defined amount of time. In various such embodiments, this may reduce false positives. In some embodiments, bubbles may be detected based on a change in density in the tube exceeds 50%. In several embodiments, the one or more tasks may include adjusting the flow of solvent through the column 232. In many embodiments, the one or more tasks may comprise establishing fluid communication between the pump 226 and a second solvent reservoir. In various embodiments, the controller may adjust one or more parameters of a chromatographic operation based on a signal generated by one or more of the CFFDs 102. In some embodiments, the signal may comprise one or more of an audible and a visual signal. In some such embodiments, the signal may comprise one or more of a flashing light and a beeping noise. In one or more embodiments, the signal may comprise a wireless communication encoded with binary data.

Figure 3A:
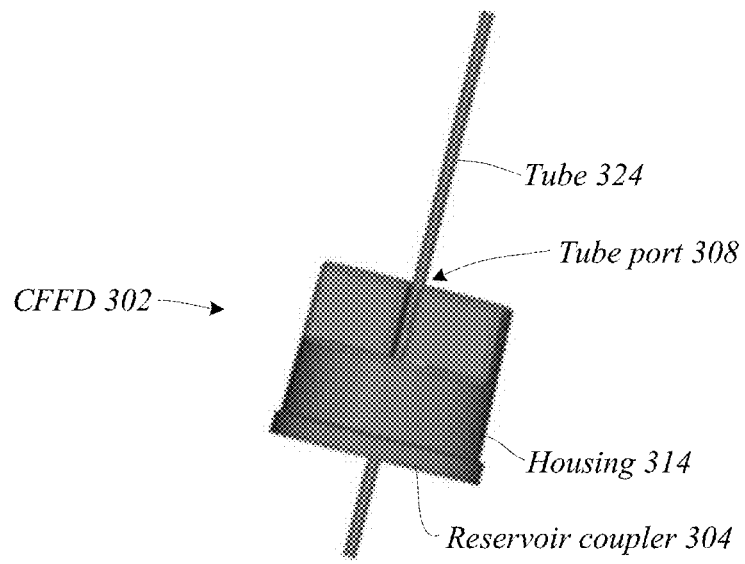
FIGS. 3A and 3B illustrate an example of a CFFD in conjunction with a tube according to one or more embodiments described herein.
Figure 3B:
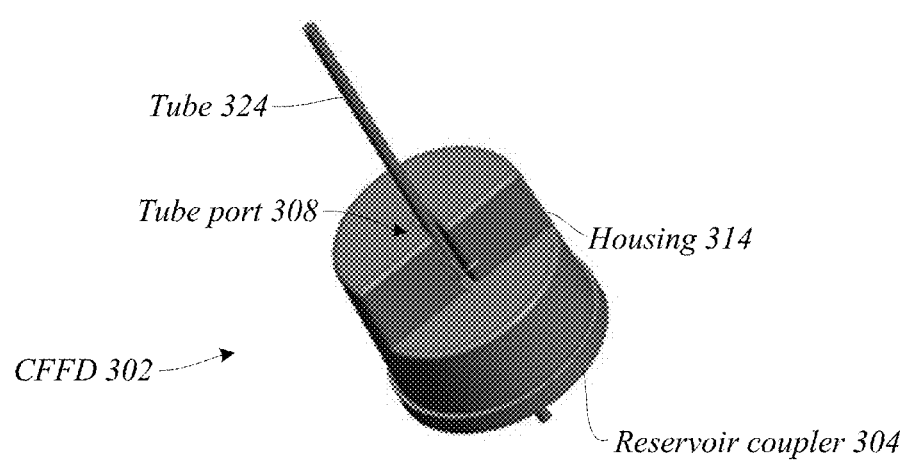

FIGS. 3A and 3B illustrate an exemplary CFFD 302 that may be representative of various embodiments. Operating environment 300A may include a first perspective view of CFFD 302 in conjunction with tube 324 and operating environment 300B may include a second perspective view of CFFD 302 in conjunction with tube 324. In various embodiments, tube port 308 may enable tube 324 to pass through housing 314 of CFFD 302. In one or more embodiments housing 314 may include reservoir coupler 304 to connect CFFD 302 with a reservoir. In some embodiments, CFFD 302, or components thereof, may be the same or similar to one or more other CFFDs, or components thereof, described herein, such as CFFD 102 of FIG. 1. For instance, CFFD 302 may include a transducer (e.g., transducer 108), logic circuitry (e.g., logic circuitry 110), and/or communication interface (e.g., communication interface 112). In some such instances, these components may be enclosed by housing 314, such as via overmolding, and therefore are not illustrated with respect to FIGS. 3A-3B. Embodiments are not limited in this context.

Figure 4:
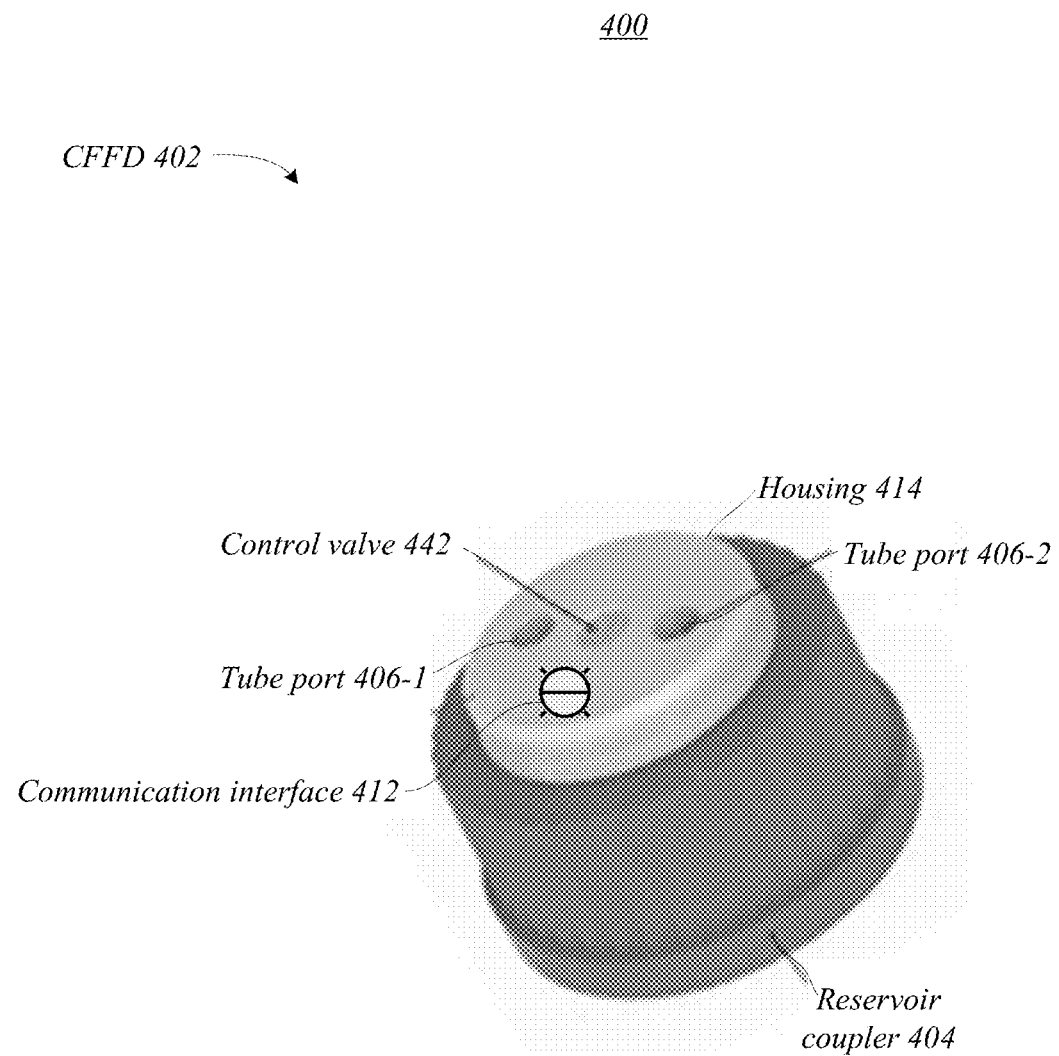
FIG. 4 illustrates an example of a CFFD according to one or more embodiments described herein.

FIG. 4 illustrates an embodiment of an operating environment 400 that may be representative of various embodiments. Operating environment 400 may include CFFD 402. In one or more embodiments, CFFD 402 may include a reservoir coupler 404, tube ports 406-1, 406-2, communication interface 412, housing 414, and control valve 442. In various embodiments, reservoir coupler 404 may connect the CFFD 402 to a reservoir for monitoring. For example, reservoir coupler 404 may include one or more of a stopper, a threaded cap, and a clamped cap to attach to the reservoir. In some embodiments, CFFD 402, or components thereof, may be the same or similar to one or more other CFFDs, or components thereof, described herein. For example, reservoir coupler 404 may be the same or similar to reservoir coupler 104 or reservoir coupler 304. Embodiments are not limited in this context.

In some embodiments, the reservoir coupler 404 may be connected to the housing 414. In one or more embodiments, the reservoir coupler 404 and the housing 414 may be formed from a single piece. In many embodiments, tube ports 406-1, 406-2 may include openings in housing 414 that provides access to the reservoir. For instance, a tube, such as a supply line or dip tube, may be inserted through the tube port 406-1, 406-2 and into the reservoir. In some embodiments, a tube accesses a reservoir through an inner diameter of the tube port and the tube port maintains a position of the tube in the reservoir. In some such embodiments, the inner diameter may be slightly less than a tube inserted therethrough. In the illustrated embodiments, a portion of communication interface 412 can protrude from housing 414. For instance, communication interface 412 may include an LED protruding from housing 414. In several embodiments, control valve 442 may enable pressure equalization between an interior and exterior of a reservoir CFFD 402 is coupled to.

Figure 5:
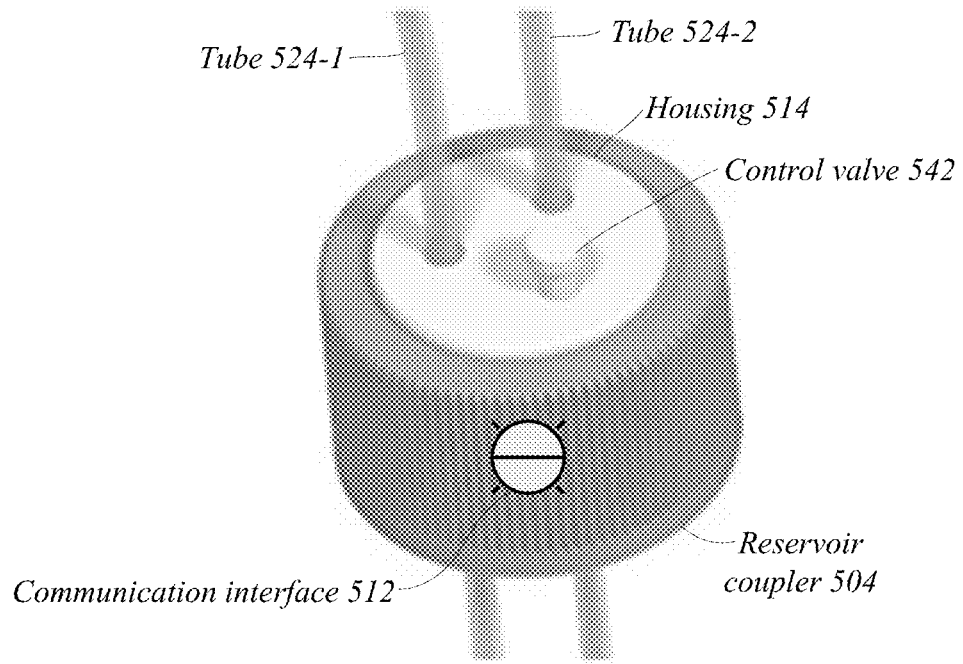
FIG. 5 illustrates an example of a CFFD in conjunction with tubes according to one or more embodiments described herein.

FIG. 5 illustrates an embodiment of an operating environment 500 that may be representative of various embodiments. Operating environment 500 may include CFFD 502 in conjunction with tubes 524-1, 524-2. In the illustrated embodiment, CFFD 502 may include reservoir coupler 504, communication interface 512, housing 514, and control valve 542. In some embodiments, CFFD 502, or components thereof, may be the same or similar to one or more other CFFDs, or components thereof, described herein. For instance, CFFD 502 may include the same components as CFFD 402. However, in CFFD 502, communication interface 512 may be located on a side of reservoir coupler 504. In one or more embodiments, communication interface 512 may be located to enable or improve visibility or connectivity. For instance, locating communication interface 512 on the side of reservoir coupler 504 may improve visibility of an LED included in the communication interface 512. In various embodiments communication interface 512 may be configured to establish a wired or wireless communication link with one or more other components of a chromatography systems. Embodiments are not limited in this context.

Figure 6:
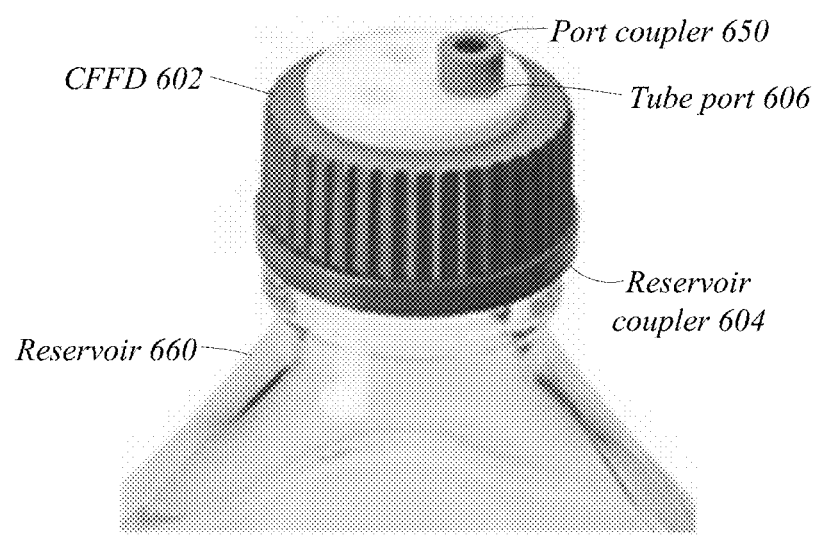
FIG. 6 illustrates an example of a CFFD in conjunction with a reservoir according to one or more embodiments described herein.

FIG. 6 illustrates an embodiment of an operating environment 600 that may be representative of various embodiments. Operating environment 600 may include CFFD 602 in conjunction with reservoir 660 and port coupler 650. In some embodiments, CFFD 602, or components thereof, may be the same or similar to one or more other CFFDs, or components thereof, described herein. In many embodiments, port coupler 650 may be configured to attach to tube port 606, wherein a tube accesses the reservoir through an inner diameter of the port coupler 650 and the port coupler maintains a position of the tube in the reservoir. In one or more embodiments, reservoir coupler 604 may comprise one or more of a stopper, a threaded cap, and a clamped cap to attach to the reservoir 660. In various embodiments port coupler 650 may attach to the tube port 606, and a tube may access the reservoir 660 through an inner diameter of the port coupler 650. In several embodiments, the port coupler 650 may maintain a position of the tube in the reservoir 660. In some embodiments, port coupler 650 may threads into the tube port 606 to attach to the tube port 606 (see e.g., tube port 706-2 of FIG. 7). In many embodiments, inserting the port coupler deeper into the tube port 606, such as by twisting, may decrease the inner diameter of the port coupler 650. In many such embodiments, this may increase friction between the port coupler 650 and the tube. Embodiments are not limited in this context.

Figure 7:
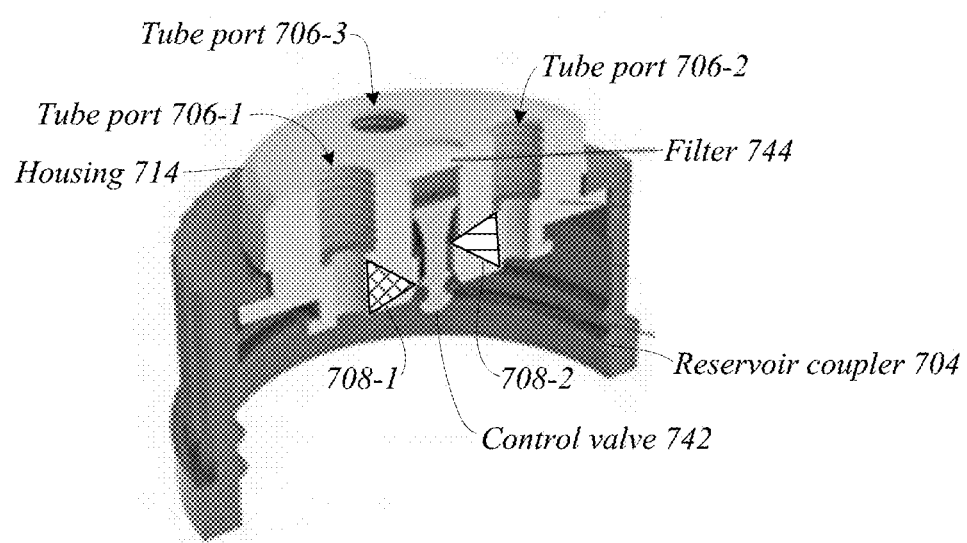
FIG. 7 illustrates an exemplary cross-sectional view of a CFFD according to one or more embodiments described herein.

FIG. 7 illustrates an embodiment of an operating environment 700 that may be representative of various embodiments. Operating environment 700 may include a cross-sectional view of a CFFD 702. In some embodiments, CFFD 702, or components thereof, may be the same or similar to one or more other CFFDs, or components thereof, described herein. In various embodiments, reservoir coupler 704 may include threads to attach to a reservoir. In one or more embodiments, transducers 708-1, 708-2 may be located proximate tube port 706-1, 706-2, respectively. In one or more such embodiments, transducers 708 may be located proximate tube ports 706 to enable them to transmit and receive signals within the tube ports 706. In such embodiments, this may enable transducer 708-1 to determine a change in density of a chromatographic fluid passing through tube port 706-1 and transducer 708-2 to determine a change in density of a chromatographic fluid passing through tube port 706-2. Embodiments are not limited in this context.

In various embodiments, transducer 708-1 may be embedded in the wall of tube port 706-1 and transducer 708-2 may be embedded in the wall of tube port 706-2. As previously mentioned, transducers 708-1, 708-2 may include ultrasonic bubble detectors. In many embodiments, CFFD 702 may include circuitry to communicatively couple the transducers 708-1, 708-2 with one or more of a power source, logic circuitry (e.g., logic circuitry 110 of FIG. 1), and a communication interface (e.g., communication interface 412 of FIG. 4).

In the illustrated embodiment, CFFD 702 may include tube ports 706-1, 706-2, 706-3 with threaded portions configured to receive a port coupler (e.g., port coupler 650 of FIG. 6). Similarly, reservoir coupler 704 may include threaded portions configured to receive a reservoir (e.g., reservoir 660 of FIG. 6). In some embodiments, CFFD 702 may include a filter 744 to protect control valve 742 and/or the contents of a reservoir CFFD 702 is coupled to from harmful contaminants.

Figure 8:
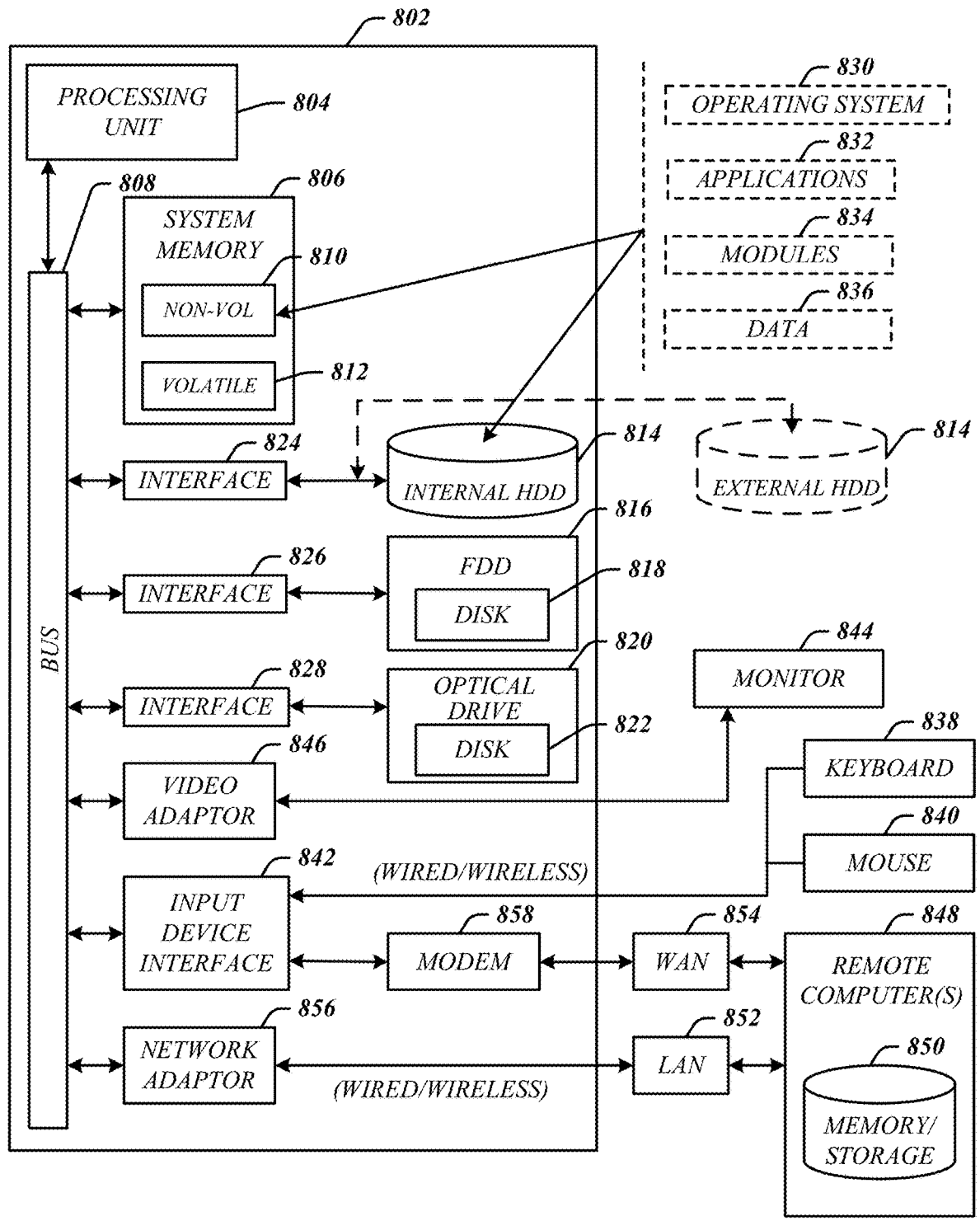
FIG. 8 illustrates exemplary aspects of a computing architecture according to one or more embodiments described herein.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of one or more components described herein. In some embodiments, computing architecture 800 may be representative, for example, of a computing device that implements or utilizes one or more portions of components and/or techniques described herein, such as logic circuitry 110, communication interface 112, transducer 108, system controller 240, and/or data controller 236. The embodiments are not limited in this context.

In various embodiments described herein, the terms "system" and "component" and "module" may refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include or implement, for example, the various techniques, applications, and/or components described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808 but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more interactions described herein may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
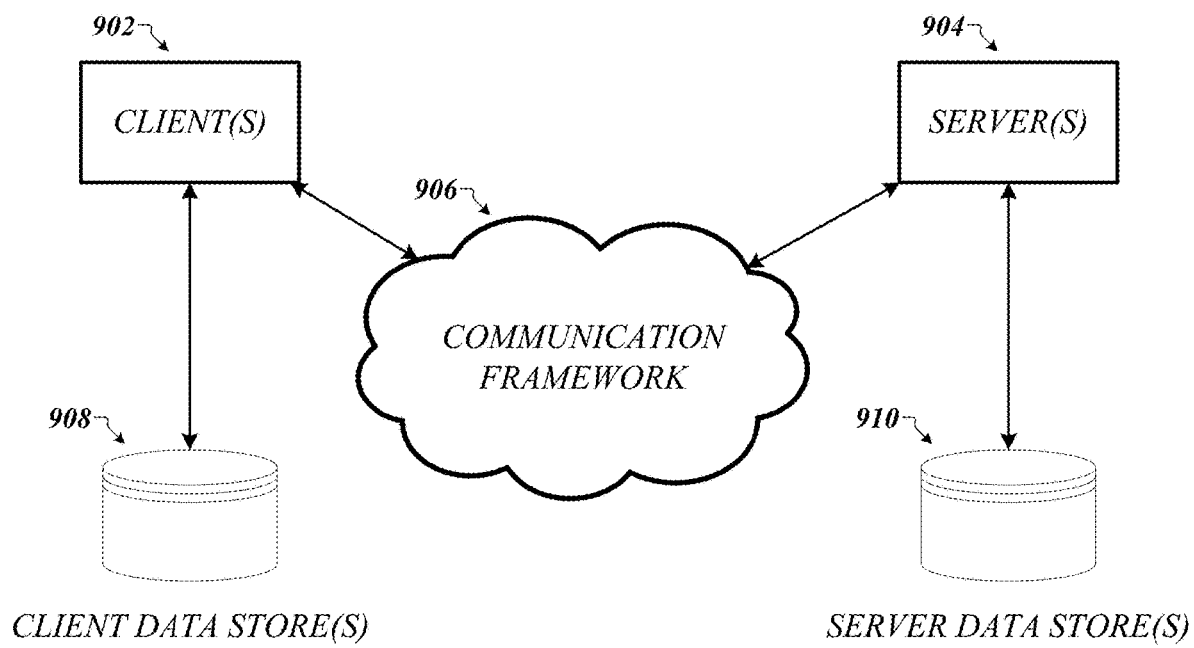
FIG. 9 illustrates exemplary aspects of a communications architecture according to one or more embodiments described herein.

FIG. 9 illustrates a block diagram of an exemplary communications architecture 900 suitable for implementing various techniques, components, and/or embodiments described herein, such as logic circuitry 110, communication interface 112, transducer 108, system controller 240, and/or data controller 236. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments, communications architecture may include or implement one or more portions of components, applications, and/or techniques described herein. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, such as in conjunction with storage of data received from any one of clients 902 on any of server data stores 910. In one or more embodiments, one or more of client data store(s) 908 or server data store(s) 910 may include memory accessible to one or more portions of components, applications, and/or techniques described herein.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Certain embodiments of the present disclosure were described above. It is, however, expressly noted that the present disclosure is not limited to those embodiments, but rather the intention is that additions and modifications to what was expressly described herein are also included within the scope of the disclosure. Moreover, it is to be understood that the features of the various embodiments described herein were not mutually exclusive and can exist in various combinations and permutations, even if such combinations or permutations were not made express herein, without departing from the spirit and scope of the disclosure. In fact, variations, modifications, and other implementations of what was described herein will occur to those of ordinary skill in the art without departing from the spirit and the scope of the disclosure. As such, the disclosure is not to be defined only by the preceding illustrative description.

The invention claimed is:

1. A device for monitoring chromatographic fluid flow, comprising:
   a reservoir coupler to attach to a reservoir comprising a chromatographic fluid;
   a tube port to provide a tube with access to the reservoir, wherein the tube accesses the reservoir to establish fluid communication between the reservoir and the tube;
   a transducer to monitor a change in density of the chromatographic fluid in the tube, the transducer to detect a presence or absence of a gas in the tube to monitor the change in density of the chromatographic fluid in the tube; and
   logic circuitry communicatively coupled to the transducer and a communication interface, the logic circuitry to communicate an indication via the communication interface based on the change in density of the chromatographic fluid monitored in the tube.

2. The device of claim 1, wherein the transducer comprises an ultrasonic bubble detector.

3. The device of claim 1, the logic circuitry to determine a level of the chromatographic fluid in the reservoir based on the change in density of the chromatographic fluid in the tube monitored by the transducer.

4. The device of claim 1, wherein the indication comprises one or more of a visible signal and an audible signal.

5. The device of claim 1, comprising a housing to enclose the transducer and the logic circuitry, wherein the housing comprises an overmold of the transducer.

6. The device of claim 1, comprising a port coupler to attach to the tube port, wherein the tube accesses the reservoir through an inner diameter of the port coupler and the port coupler maintains a position of the tube in the reservoir.

7. The device of claim 1, the indication to communicate a level of the chromatographic fluid in the reservoir is above or below a threshold.

8. The device of claim 1, the logic circuitry to:
   compare the change in density of the chromatographic fluid in the tube monitored by the transducer to a threshold; and
   provide the indication when the change in density of the chromatographic fluid in the tube exceeds the threshold.

9. The device of claim 8, wherein the logic circuitry provides the indication when the change in density of the chromatographic fluid in the tube exceeds the threshold for a predetermined amount of time.

10. A method, comprising:
    utilizing fluid communication of a chromatographic fluid between a reservoir and a tube to perform a chromatographic operation;
    monitoring a change in density of the chromatographic fluid in the tube with an ultrasonic bubble detector;
    comparing the change in density of the chromatographic fluid to a threshold; and
    communicating an indication via a communication interface when the change in density of the chromatographic fluid exceeds the threshold during the chromatographic operation.

11. The method of claim 10, comprising communicating the indication via the communication interface when the change in density of the chromatographic fluid exceeds the threshold for a defined amount of time during the chromatographic operation.

12. The method of claim 10, comprising communicating the indication via the communication interface with a visual or audible signal.

13. The method of claim 10, comprising adjusting a flow of solvent through a chromatographic column based on the indication.

14. A system for fluid chromatography, the system comprising:
    an injector for injecting a sample into a flow of solvent, wherein the flow of solvent causes the sample to pass through a column in a chromatographic operation;
    a pump for creating the flow of solvent through the column, wherein the solvent is pumped from a solvent reservoir in fluid communication with the pump via a tube; and
    a chromatographic fluid flow device (CFFD) to couple with the solvent reservoir, the CFFD comprising a transducer for detecting a presence or absence of a gas in the tube, wherein the CFFD generates a signal based on the presence or absence of gas in the tube.

15. The system of claim 14, comprising a controller communicatively coupled to the CFFD, the controller to perform one or more tasks when an amount of gas bubbles detected in the tube exceeds a threshold.

16. The system of claim 15, wherein the threshold is based on a number of gas bubbles detected in the tube by the transducer or a density within the tube changing by 50% or more.

17. The system of claim 15, the one or more tasks comprising adjusting the flow of solvent through the column.

18. The system of claim 15, the one or more tasks comprising establishing fluid communication between the pump and a second solvent reservoir.

19. The system of claim 14, comprising a controller to adjust one or more parameters of the chromatographic operation based on the signal generated by the CFFD.

* * * * *